No. 628,028. Patented July 4, 1899.
F. R. PACKHAM & G. P. OATES.
DISK HARROW.
(Application filed Feb. 4, 1899.)
(No Model.) 4 Sheets—Sheet 1.

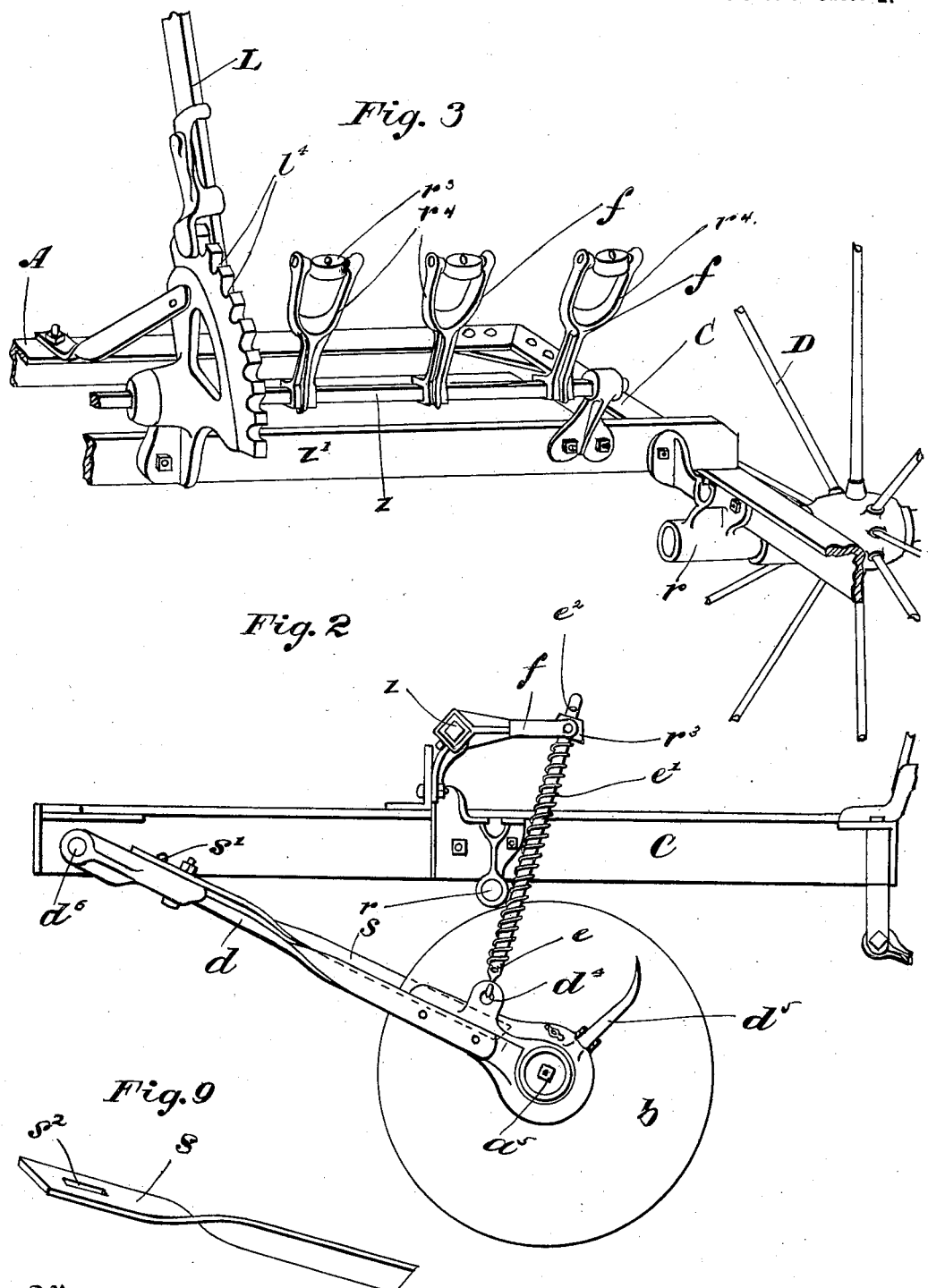

No. 628,028. Patented July 4, 1899.
F. R. PACKHAM & G. P. OATES.
DISK HARROW.
(Application filed Feb. 4, 1899.)
(No Model.) 4 Sheets—Sheet 3.

Witnesses
Harry G. Wiseman
Chas. J. Welch

Inventors
Frank R. Packham
and Geo. P. Oates
By Attorney

No. 628,028. Patented July 4, 1899.
F. R. PACKHAM & G. P. OATES.
DISK HARROW.
(Application filed Feb. 4, 1899.)
(No Model.) 4 Sheets—Sheet 4.

Witnesses
Harry J. Wiseman
Chas. I. Welch

Inventors
Frank R. Packham
and Geo. P. Oates
By Attorney

UNITED STATES PATENT OFFICE.

FRANK R. PACKHAM AND GEORGE P. OATES, OF SPRINGFIELD, OHIO, ASSIGNORS TO THE SUPERIOR DRILL COMPANY, OF SAME PLACE.

DISK HARROW.

SPECIFICATION forming part of Letters Patent No. 628,028, dated July 4, 1899.

Application filed February 4, 1899. Serial No. 704,597. (No model.)

*To all whom it may concern:*

Be it known that we, FRANK R. PACKHAM and GEORGE P. OATES, citizens of the United States, residing at Springfield, in the county of Clark and State of Ohio, have invented certain new and useful Improvements in Disk Harrows, of which the following is a specification.

Our invention relates to improvements in disk harrows; and it relates particularly to improvements in the construction of disk harrows in a way that permits an independent movement of the disks.

One of the objects in the constructions hereinafter shown consists in providing disk harrows, the disks of which can be operated independently and each of them movable vertically.

An additional feature is in providing means for regulating the depth of cultivation by carrying-wheels worked in connection with depressing-levers.

A further feature consists in cutting out the center space formed by the two series of disks in the manner hereinafter shown and described.

These objects are attained by the constructions shown in the accompanying drawings, in which—

Figure 1:
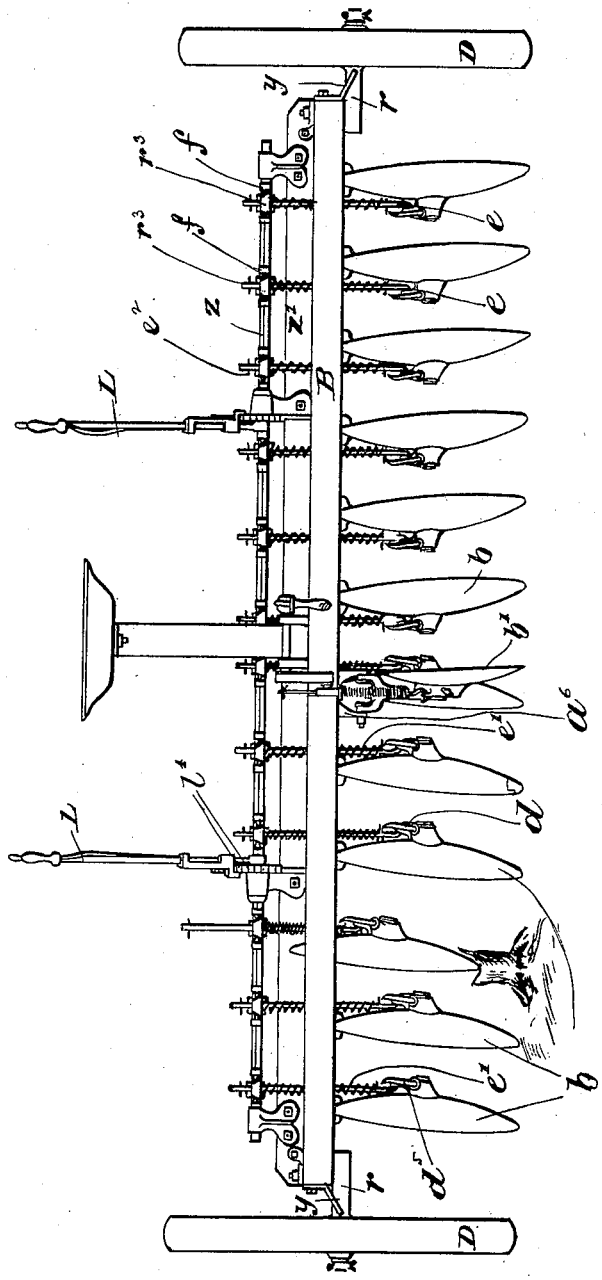
Figure 6:
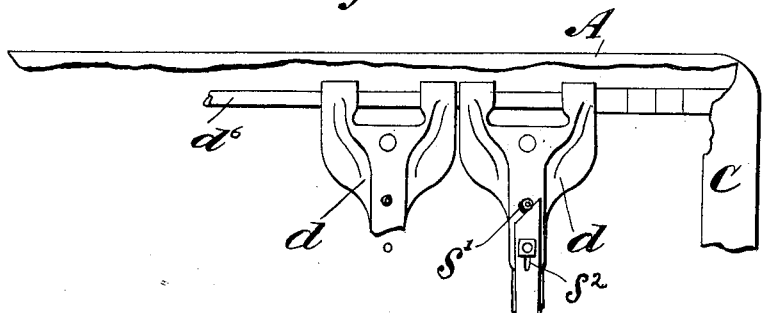
Figure 4:
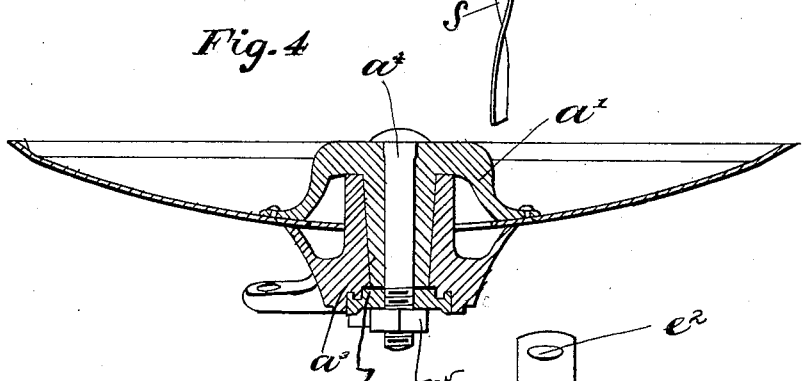
Figure 5:
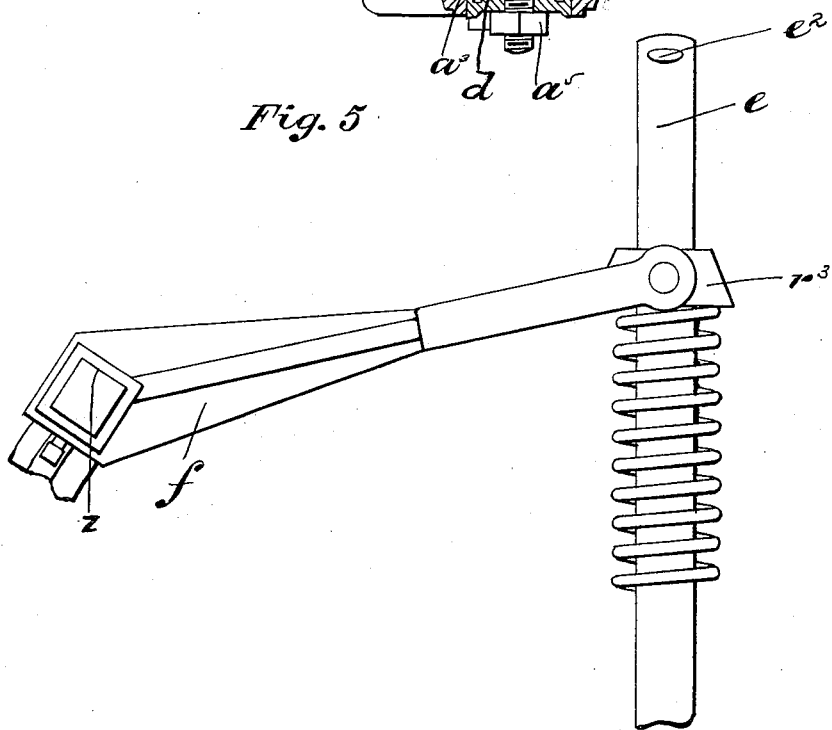
Figure 7:
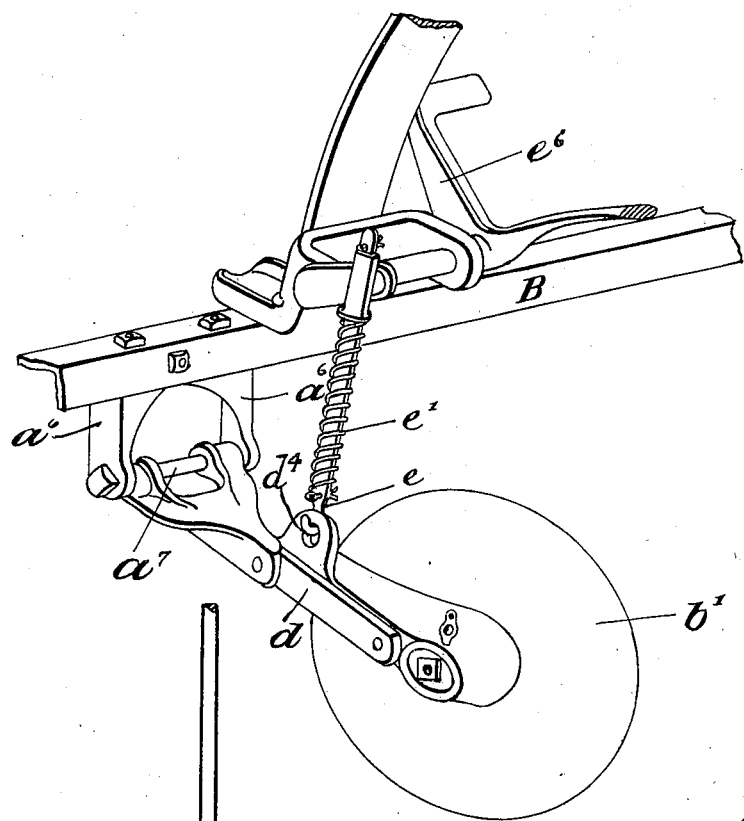
Figure 8:
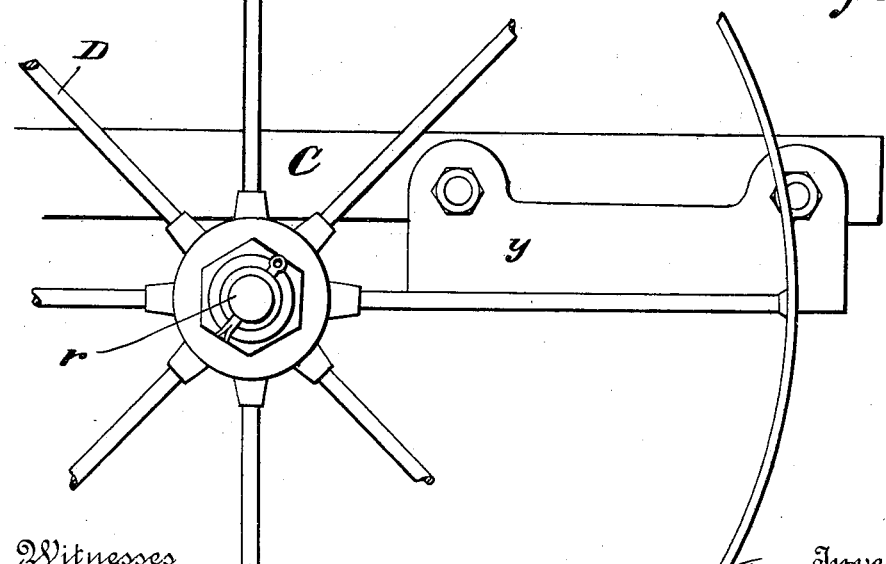

Figure 1 is a rear view of a disk harrow embodying our invention. Fig. 2 is a side elevation of one of the disks and its attachments. Fig. 3 is a detail perspective view of parts of the connections for the disk. Figs. 4 and 5 are detail views of one of the disks and its stem and lifting-arm. Fig. 6 is a detail view of one end of the drag-bar and scraper. Fig. 7 is a perspective view of the center cutting-disk and attachment. Fig. 8 is a side elevation of the carrying-wheel, showing the fender. Fig. 9 is a detail view of the scraper attached to the drag-bar.

Like parts are represented by similar letters of reference in the several views.

In the accompanying drawings the frame consists of the side bars C, the front bar A, the rear bar B, and bed-rail $z'$.

D represents the carrying-wheels, $r$ the supporting-axles for said carrying-wheels, and $y$ the fender attached to the side C of the frame. The carrying-wheels D are mounted upon short axles $r$, which are attached to the side bars C and preferably also to the bed-rail $z'$.

The disks are independently attached in series of six, more or less, at the right and same number at the left side, near the front bar A of the frame, and are pivoted in such manner that they may be easily raised or depressed. L is the lever, which, with the segment, is adapted to lift said disks free from the ground, and said parts are then carried and supported by said carrying-wheels D D. There are preferably two levers, each adapted to operate one series of disks.

The drag-bar $d$ is preferably formed at its front pivoted end with projecting loops, through which the draft-bar $d^6$ is extended, which in turn is pivoted to the side bars C. Said drag-bar is preferably quarter-twisted, and at its free end is attached to the disk $b$ on its convex or non-working side. Said drag-bar is formed with a flange, with a hole $d^4$ in the top thereof. The stem $e$, with a hook or any well-known form of attachment, is adapted to be attached to the flange of each drag-bar at $d^4$, which stem, extending vertically, is connected to a lifting-arm $f$, fastened to one of the rock-shafts $z$, which extend across the top of the frame and each of which is journaled at each end in a suitable support on the bed-rail. The free end $r^4$ of said arm $f$ is formed in the shape of a yoke, and there is pivoted in said yoke a support or block $r^3$, through the center of which said stem $e$ extends and is held in place by a pin $e^2$. The levers L are attached to the right and left shaft $z$, and the notches $l^4$ indicate the distance the lever is moved. The constructions are such that when the disk is lifted and the stem moves vertically the block or support $r^3$ compensates for the movements of said lifting-arm and drag-bar on arcs of different circles. It is therefore clear that this relative arrangement of lifting-arms and the drag-bars preserves an almost vertical and direct position for the spring $e'$ and stem $e$ in the several positions taken by the disks when working.

The disk is formed with a cup-shaped bearing-support $a'$, with a trunnion $a^3$ extending through the disk and the bolt $a^4$ extending from the concave or working side of the disk through the trunnion $a^3$, and the nut $a^5$ to hold the bearing-support for said disk and the drag-bar, which is attached thereto, securely to the convex side of the disk and prevent mud, dirt, and other substances from getting into the bearing by means of the protection afforded the bearing-support on the working side of said disk. s is the scraper, formed, as shown in Fig. 9, with a quarter-twist and the slot $s^2$ at one end, so that it may be pivoted to the pivoted end of the drag-bar $d$ by means of a bolt passing through the slot. Said scraper is further formed with an angular end, and by means of a stud $s'$, projecting from the drag-bar, its relative position to the disk may be maintained. Further protection from mud and obstructions, preventing the easy operation of the disks and attachments, is provided by a clod-hook $d^5$, which is attached to the free end of the drag-bar and its upper end curved upwardly in such a way as to remove the clods and other obstructions from the working face and bearing of the disk, it being evident that the same effect may be produced by hooks attached to the rear bar B of the frame and extending downwardly and along the working face of each disk, and by turning the clod-hooks in their bearings with hook down the fresh-plowed lands having clods can be further pulverized by engaging the turned-down hooks. The shield $y$ extends downwardly from the side C of the frame and is adapted to prevent clods and other things from obstructing the carrying-wheels.

In Fig. 7 is shown a disk $b'$ for cutting out the center space usually left between the right and left hand series of disks. Said disk is pivoted to the rear bar B by means of depending loops $a^6$ and a bolt $a^7$. The drag-bar is of the same shape as the other drag-bars. The lifting-arm is attached to its drag-bar $d$ in the same manner as in the other drag-bars, and said stem or arm is attached to a crank foot-lever $e^6$, which in lifting and depressing the link and draw-bar, when actuated to the full limit of its stroke, locks said link and draw-bar against further movement. In ordinary operation by pressing said lever the cut-out disk will be pressed farther in the ground.

In operation the machine has many advantages over other forms of disk harrows. The construction of the disks, axles for carrying-wheels, and connections is such that any disk may be raised and held from the ground without interfering with the operation of the machine and same can be done easily. A further result of the construction shown is that in operation the ground is pulverized evenly by reason of the independent adjustment of the disks and the entire machine operated with little chance of the parts being obstructed.

Having thus described our invention, we claim—

1. The combination of a series of disks, drag-bars attached to the convex side of the disks independently mounted, lifting-arms fastened to rock-shafts with pivoted blocks in their free ends, adapted to raise and depress the disks, stems connecting the lifting-arms to said disks, said blocks being adapted to compensate for the movements of said drag-bars and lifting-arms in arcs of different circles.

2. The combination of a pivoted drag-bar, a disk attached on its convex side to said drag-bar, a scraper with an angular end pivoted to the head of the drag-bar and a projection on the head of said drag-bar for maintaining the scraper in its relative position with the working side of said disk.

3. In a disk harrow, the combination of a drag-bar, a disk pivoted to the drag-bar, a stem extending vertically from the drag-bar of the disk, a spring around said stem, a lifting-arm with its outer end formed with a pivoted block adapted to permit the stem to extend through said block, and means for raising and depressing said lifting-arm.

4. In a disk harrow the combination of a concave disk formed with a cup-shaped bearing-support with a trunnion extending through the opening in the center of said disk, a pivoted drag-bar having a bearing to fit over said trunnion, and means for connecting said disk through said trunnion to the bearing-support of the drag-bar.

5. In a disk harrow, the combination of a drag-bar, a concave disk attached to the free end of said bar, a clod-hook extending upwardly from the top of the free end of the said bar and adapted to throw from the face of said disk clods and other obstructions.

6. In a disk harrow, the combination of a rock-shaft pivoted to the top of said frame, independently-mounted concave disks pivoted near the front of said frame, lifting-arms journaled on said shaft, stems attached to said disks and pivoted to said lifting-arms, and means for regulating the depth of cultivation of said disks.

7. In a disk harrow, the combination of right and left hand series of disks independently mounted near the front of the frame, a single disk pivoted to the rear of said frame and at approximately the center thereof and adapted to cut out the center space between the right and left hand series of disks.

8. In a disk harrow, the combination of right and left hand series of disks independently mounted near the front of the frame and adapted to be lowered and raised, a single disk pivoted to the rear of said frame and at the center thereof, a stem and spring, a crank adapted to lift the disk and being self-locking in both directions when actuated to the full limit of its stroke in either direction.

9. In a disk harrow, the combination of a frame, independently-mounted disks, carrying-wheels attached to the sides of said frame by short axles, and a shield extending from the sides of said frame in proximity to the said wheels and adapted to prevent clods from obstructing said wheels.

10. In a disk harrow, the combination of a drag-bar, a concave disk attached to the free end of said drag-bar, a clod-hook extending upwardly from the top of the free end of the said drag-bar adapted to throw from the disk clods and other obstructions and further adapted when turned in its bearing until the hook extends downwardly to pulverize fresh mud or similar obstructions.

11. In a disk harrow, the combination of right and left hand series of disks independently mounted near the front of the frame and adapted to be lowered and raised, a single disk pivoted at or near the center of the rear of said frame, stem and spring, foot-crank adapted to lift the disk, being self-locking in both directions and further adapted by pressure of the foot to regulate the depth of cultivation.

In testimony whereof we have hereunto set our hands this 6th day of January, A. D. 1899.

FRANK R. PACKHAM.
GEORGE P. OATES.

Witnesses:
CHAS. I. WELCH,
EARL G. WELCH.